June 8, 1937. R. E. BOWLEY Re. 20,395

METHOD AND APPARATUS FOR TONE COMPENSATION
IN SOUND REPRODUCING APPARATUS
Original Filed Jan. 9, 1933

Inventor
Raymond E. Bowley
H. A. Lilach
Witness

Reissued June 8, 1937

Re. 20,395

UNITED STATES PATENT OFFICE 20,395

METHOD AND APPARATUS FOR TONE COMPENSATION IN SOUND REPRODUCING APPARATUS

Raymond E. Bowley, San Anselmo, Calif.

Original No. 1,970,837, dated August 21, 1934, Serial No. 650,848, January 9, 1933. Application for reissue August 5, 1936, Serial No. 94,448

31 Claims. (Cl. 181—31)

This invention relates to improved methods and apparatus for tone compensation in sound reproducing apparatus of the class adapted for use with radio receiving sets, theatre sound systems and other sound translating and resonating devices of like nature.

In the embodiment of my invention illustrated and described in my co-pending United States Patent application Number 44,754 filed October 12, 1935, reissue of U. S. Patent Number 1,934,693, filed September 12, 1932, there is a marked improvement in clarity and diminished distortion of tones, but tone compensation is not absolute when the auxiliary diaphragm described therein is used without other tone compensatory means also being employed to bring out the lower tones in their proper relation. This drawback is obviated to a great extent in my improved auxiliary diaphragm and method of tone compensation by the combination therewith of one or more metal resonators or metal conductory mediums as described herein.

One of the objects of the invention is the provision of an auxiliary tone compensator device or tubular resonant diaphragm adapted to serve as auxiliary sound baffle means in combination with a baffle or sound board, and forming a plurality of fluid channels adjacent an orifice in the sound baffle, one or more metal members arranged around the orifice in combination with the members forming the fluid channels and acting as resonators or resonant couplers, assisting in the process of blending reproduced tones.

An object of the invention in general is to provide an improved acoustic tone blending medium, the action of which in response to vibrations set up therein by acoustical conduction resonance action by a loud speaker and baffle means (as described in my aforesaid patent application 44,754, and by sound waves propagated from both surfaces of a speaker diaphragm acting upon opposite ends of a plurality of fluid channels or resonant air-columns set into oscillation by condensations and rarefactions set up in the fluid areas associated therewith and separated by baffle means), will re-enforce certain tones and cause reproduced tones to become clear, enriched and of high fidelity, the construction of the device being such that the associated metal elements act to conduction couple acoustically separated elements of the associated apparatus, and also as resonators, "conduction couple" being defined, as: the communication of sound vibrations from one body to another through or by means of a resonant vibratory conductor medium interposed between said bodies and acting to transmit sound vibrations therebetween: (*a*) by bodily contact; (*b*) or through a homogeneous body from particle to particle, said homogeneous body comprising a resonant coupler medium interposed between two spaced resonant elements of acoustic apparatus in an air column of an air chamber of a hollow body or cabinet containing sound reproducing means, including a diaphragm with driving means, the inner surface of said diaphragm in vibratory communication with said air column, the other surface of the diaphragm exposed to the atmosphere.

Another object of the invention is to provide an acoustic device comprising a baffle forming a sounding board having a plurality of tubular members engaging the front surface thereof.

A further object of my invention is to provide improved acoustic apparatus comprising in combination, a loud speaker diaphragm positioned in separated relation to walls of a cabinet, one or more metal mediums engaging the sound baffle and loud speaker and conduction coupling said elements of the apparatus acoustically, and a plurality of tubular members arranged in combination with the sound baffle and metal member or members.

Other objects more or less apparent and too numerous to relate in detail, will present themselves or will be specifically pointed out in the description of my invention which is to follow.

In the accompanying drawing:

Fig. 2 shows how the device may be combined with a sound producer diaphragm. The details of mechanical construction being left to the skill of the experienced workman employing this method of tone compensation either with the tubes or without the tubes, and forming a tone blending chamber within a cabinet.

Figure 1:
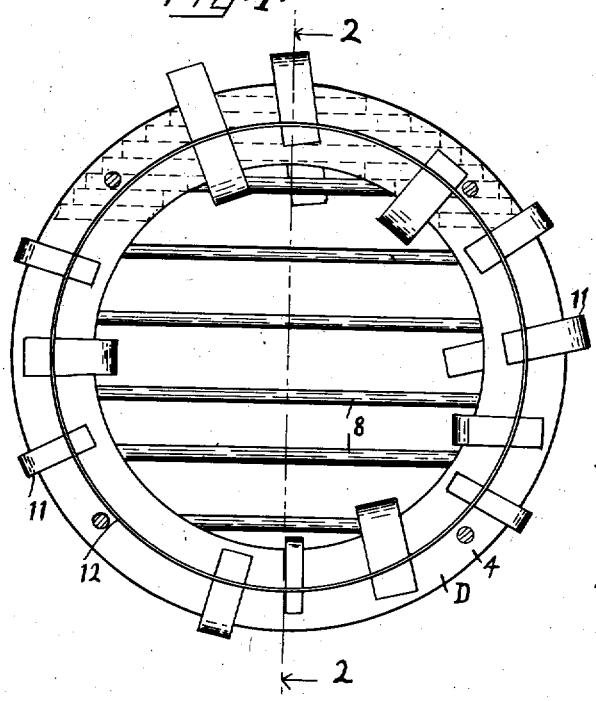
Fig. 1 is a front view of acoustic apparatus embodying my invention, showing the relative positions of the tubular members and metal resonators or resonant couplers, and a wire support for the metal members.
Figure 3:
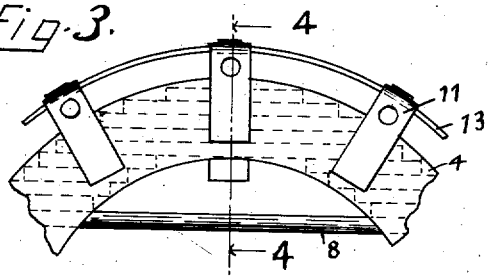
Figure 4:
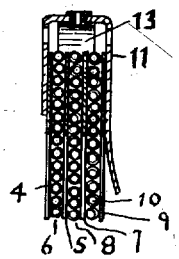

Figs. 3—4 are a fragmentary part of an auxiliary diaphragm showing other suitable means than that illustrated in Fig. 1 for maintaining the metal elements in their proper relative positions.

Figure 5:
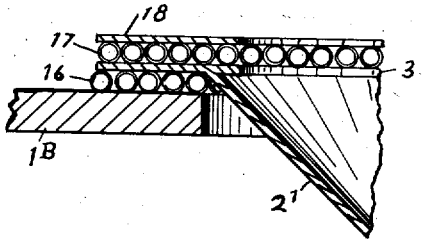

Fig. 5 is a sectional view of a fragmentary part of a modified form of my invention showing the relative positions of a loud speaker diaphragm, a baffle or sound board and the tubular members.

The embodiments of the invention illustrated and described herein have been selected for the purpose of setting forth the principles involved. The invention is, however, susceptible to being further modified to meet different conditions encountered in its use without departure from the inventive concept disclosed. The details of mechanical construction may be determined by the skill of the experienced workman employing the principles and methods involved.

Referring to the drawing:

The numeral 1 designates a sound board or baffle, of a suitable casing, cabinet, or enclosure having a sound opening through which the waves from a sound reproducer may freely pass. Suitably secured to the baffle support 1 by screws or other suitable means is the improved auxiliary diaphragm D and a loud speaker represented by diaphragm 2, it being understood that the drawing is for illustration purposes only.

The auxiliary diaphragm or sound baffle D is positioned around the opening in the sound baffle, with certain tubes thereof (8) extending across the said opening. The diaphragm D includes a front ring-shaped support or member 4 constructed from paper, fibre, or other suitable material. Positioned between the support 4 and another member (5) of similar form, are a plurality of tubular members (6) constructed from paper, fibre or other suitable material. Positioned between the ring-shaped member (5) and another similar member (7) are a plurality of tubular members (8), some of which extend entirely across the central openings in the ring-shaped supports.

Disposed between support (7) and a rearwardly disposed support (9) are a plurality of tubular members (10). The different sets of tubular members may also be positioned at angles to one another as shown in my co-pending application for U. S. Letters Patent 44,754, filed October 12, 1935, entitled The art of blending fundamental tones and their harmonics and overtones in sound reproducing apparatus, formerly U. S. Patent Number 1,934,693, filed September 12, 1932.

Energy for driving a sound producer diaphragm may be secured from an electrical circuit through electro-dynamic driving means or other suitable driving means. It is understood this invention is not limited to any special or particular form of speaker.

Figure 2:
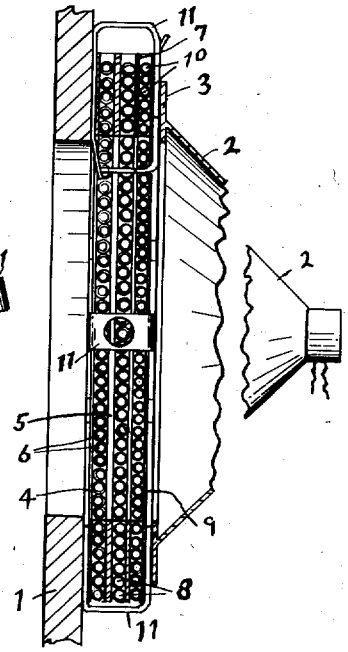
Fig. 2 is a vertical sectional view taken on the line 2—2 of Fig. 1, showing my improved auxiliary diaphragm positioned in operative relation between a sound baffle and a loud speaker (the diaphragm only is illustrated for simplicity of description, it being understood that any loud speaker of the class described may be used).

Positioned at the side edges of the auxiliary diaphragm are a plurality of U-shaped metal elements (11) which are preferably separated from one another by an intervening space. The metal resonators form resonant vibratory sound conductor arms or resonant couplers acting to distribute sound vibrations between associated elements of acoustic apparatus in combination with the diaphragm of a loud speaker of the class described, in an air column within a hollow body or cabinet; as illustrated the metal resonators are coupled between the front face of the rim of the loud speaker and the sound baffle support, but it is understood that other arrangements may be used without departing from the spirit of the invention. The resonators are positioned with one leg of each contacting with the flange (3) of the loud speaker (2), and the other by engaging with the baffle or sound board (1). Either or all of the metal members may be positioned with one leg engaging with one of the ring-shaped members and another leg engaging with another of the ring-shaped members, as illustrated by Fig. 2, or in other suitable positions. Some of the metal members are preferably constructed with holes in their central portions, while others have elongated legs projecting inwardly beyond the inner circumferential edge of the device. The purpose of the holes in some of the metal resonators or resonant couplers is to secure certain tone effects which those metal members not having such a construction are incapable of securing. The legs of certain of the metal resonators, projecting inwardly beyond the ring-shaped supports, serve to intercept the sound waves proceeding directly from the diaphragm.

The metal resonators (11) may be held in their proper relative positions by means of a wire (12) soldered or otherwise fastened thereto, as shown in Fig. 1, or, by a metal band (13) secured by rivets to their central parts as shown in Figs. 3 and 4, or by other suitable means. The metal resonators (11) as shown in Figs. 3 and 4 may have holes provided therein, thereby permitting certain desirable tone effects to be secured. The metal resonators (11) being in engagement with both the loud speaker (2) and the baffle (1) serve to carry vibrations from one to the other, thereby assisting in the process of blending reproduced tones.

It has been found that sound resonating characteristics of the apparatus are considerably improved by having legs of certain of the metal resonators extending inwardly to points where they directly intercept sound vibrations proceeding from the diaphragm of the loud speaker (2). Other tone characteristics can be obtained by having certain of the metal resonators (11) positioned with legs thereof extending outwardly beyond the outer circumferential edge of the diaphragm (D).

The tubular members (6), (8) and (10) each act as individual resonators, and their walls upon vibrating set up a multiplicity of sound waves which proceed to and from different fluid areas within the cabinet, or enclosure with which the device is used, a thorough blending of tones accomplished by means of the tubular members, the ring-shaped members or supports and the metal resonators, enables the resonating of tones having enriched and improved qualities.

This invention employs improved methods comprising the principles of acoustical conduction described and claimed in my co-pending U. S. Patent application No. 44,754 before referred to; conduction being as defined in Century Dictionary — con=together — duct=transmit—conduction=bringing together, convection and radiation.

In Webster's International Dictionary, conduction is defined as bringing together—1. The act of leading or guiding; 2. The act of training up (obs.); 3. Transmission through or by means of a conductor; also conductivity; 4. (*a*) The communication of (sound vibrations) from one body to another when they are in contact, or (*b*) through a homogeneous body from particle to particle, constitutes conduction (American Encyclopaedia).

Convection is defined in Webster's International Dictionary as—to bring together—the act or process of conveying or transmitting.

The methods described herein act so as to blend and bring together tones from musical instruments, sound making apparatus of various kinds, voice tones, etc., and other tones having different, but definitely related, frequencies, as—fundamental tones and the harmonics and overtones accompanying said fundamental sound vibrations, both as to proper phase relation and the number and intensity of relation.

As shown in Fig. 5, my invention may embody a modified form in which the enlarged end of a loud speaker diaphragm ($2^1$) extends through an opening in a baffle ($1^B$). In this form a series of tubular members (16) are positioned engaging the front surface of baffle ($1^B$); the tubes (16) also illustrate another modification wherein a baffle panel is in combination with a plurality of tubular members engaging the front face thereof, and with a sound producer diaphragm, with other similar tubular members (17) placed between the said flanged rim of the diaphragm and a ring-shaped member (18). The tubes may be fastened by glue or other suitable means.

I have found that the size, shape and relative arrangement of the tubular members and supports may be varied to obtain different tone effects, and also that a change in material from which the metal elements are made together with a change in their relative arrangement with respect to the various parts of the apparatus, or a change in their size, shape and thickness will likewise cause a variance in the qualities of the tones acted upon. It is therefore apparent that numerous changes may be made in the form my invention may assume without departing from the principles thereof.

Obviously the basic idea of my invention, "blending tones by acoustical conduction," may be mechanically carried out in other ways than those herein set forth by way of illustration; different materials and cabinets may impose their own peculiarities on the ultimate quality of the tones produced. I desire it understood, therefore, that the claims hereunto appended are to be considered in defining my invention rather than the exact disclosures herein made.

No claim is made in this specification to a vibratory diaphragm, and an auxiliary diaphragm mounted on a supporting means, the auxiliary diaphragm being in physical contact with the vibratory diaphragm, as this is described and claimed in my co-pending application for Letters Patent of the United States, filed October 12, 1935, Serial No. 44,754.

No claim is made in this specification to a sound board, and a plurality of tubular members interposed between the diaphragm and the sound board, as this is described and claimed in my co-pending application for Letters Patent of the United States, Serial No. 44,754, Sound reproducing apparatus.

Having described my invention, what I claim is:

1. Sound reproducing apparatus comprising, in combination, a sound producer diaphragm with driving means, a plurality of tubular members positioned adjacent the diaphragm and one or more metal resonators positioned adjacent the diaphragm and tubular members.

2. Sound reproducing apparatus including in combination a diaphragm, electro dynamic driving means operatively coupled with the diaphragm, the diaphragm spaced from a sound baffle support, a sound baffle supporting the sound reproducing means; one or more ring-shaped members interposed between the sound baffle and the front face of a flanged rim of the diaphragm the diaphragm having a flanged rim, and one or more metal resonators engaging with the sound baffle adjacent an opening therein.

3. Sound reproducing apparatus having in combination a sound baffle "support", a diaphragm, electro-dynamic driving means operatively coupled with the diaphragm, a ring-shaped member, at least one metal resonant coupler engaging with the sound baffle, and with the ring-shaped member, the ring shaped member and a resonant coupler, interposed between the front face of the diaphragm and said sound baffle support, the sound baffle supporting said apparatus.

4. An acoustic device comprising in combination a sound baffle having an outlet for sound; a hollow diaphragm, a plurality of resonator tubes arranged adjacent the front face of the periphery of said diaphragm between the said periphery of the diaphragm and parallel with the baffle located in front thereof, and at least one metal resonant coupler interposed between the sound producer device and the baffle associated therewith, and a driving unit arranged to cause said diaphragm as well as said resonant tubes, baffle, and metal member, to operate substantially as set forth.

5. A resonant vibratory tone compensating device adapted for use in combination with an orificed sound baffle, within a resonant air column in a sound chamber having fluid connection with the outer atmosphere, comprising, a resonant vibratory unit supported within metallic means having a plurality of resonant arms or elements extending from the front to a rear part of the device, the device including at least one member having an orifice therein, the device adapted to modify or modulate reproduced tones resonated to the ears of a listener by sound reproducing apparatus, in combination with a sound baffle.

6. A resonant vibratory tone compensating device consisting of a hollow unit, at least one vibratory metal arm and an orificed sound baffle member, the device adapted to function in a resonant air column within resonant walls forming a sound chamber having an outlet forming fluid connection between said resonant air column and the outer atmosphere, in combination with sound reproducing means including a hollow diaphragm located within said sound chamber adjacent the resonant vibratory device, the device adapted to modify or to modulate reproduced tones within the frequency range of the apparatus, resonated to the ears of a listener.

7. In a device of the class described, for propagating and resonating sound vibrations, an orificed baffle means, resonant vibrating means mounted adjacent an orifice in the baffle means, sound producing means including a diaphragm, driving means of the class described adapted for coupling with an electrical source of energy operatively coupled with said diaphragm, and means including at least one vibratory arm coupled to the resonant vibratory device and interposed between said device and an element of the sound reproducing device.

8. In a device of the class described, for resonating sound from a loud speaker disposed in a sound chamber having resonant walls, an orificed sound baffle means having at least one resonant wall, resonant vibratory means mounted on a baffle member adjacent an orifice therein, sound reproducing means including a diaphragm supported by a loud speaker, driving means of the class described adapted for coupling with an electrical source of energy operatively coupled with said diaphragm, and means including at least one vibratory arm coupled to the resonant vibrating device and also coupled to a resonant element of sound baffle means.

9. A sound baffle having an outlet therein for the passage of sound vibrations from the front surface of a hollow diaphragm, a diaphragm, driving means operatively coupled with the diaphragm; and a resonant vibratory device interposed between the diaphragm and the sound baffle adjacent said outlet therein, said device supported by the sound baffle and including one or more resonant vibratory arms extending from the device in the path of sound vibrations propagated from said diaphragm to the rear of said baffle with the outlet therein, said combination of sound baffle and resonant vibratory device with sound reproducing means acting to modify or modulate tones resonated to the ears of a listener.

10. Acoustic apparatus of the class described comprising the combination with a resonant sound baffle of wood or other suitable material having an outlet therein for the passage of sound vibrations from a diaphragm, of one or more supplementary resonant air columns located in acoustical resonance coupled relation parallel with at least one surface of said baffle member, said resonant means adapted to form a sounding board as a unit of an apparatus cabinet including tone compensatory supplementary resonant air columns adapted to modify or modulate reproduced tones within the frequency range of the apparatus, resonated to the ears of a listener.

11. In acoustic resonant tone compensating apparatus, a resonant sound chamber within baffle walls and having fluid connection with the outer atmosphere, a sound baffle member having outlet means provided for the passage of sound vibrations from the front surface of a hollow diaphragm associated with sound reproducing means of the class described, the sound reproducing means located in the sound chamber adjacent the orificed baffle member having in combination therewith, one or more resonant vibratory mediums arranged within said sound chamber in separated relation to the walls thereof, but having the ends thereof coupled with two or more separated associated elements of apparatus, the said resonant coupler medium located in the sound chamber in the path of sound waves propagated from the rear surface of said diaphragm behind the orificed baffle member, the arrangement of said resonant device in combination with said apparatus adapted to modify or modulate reproduced tones resonated to the ears of a listener.

12. Acoustic apparatus comprising the combination with a hollow diaphragm, driving means and supporting means for the diaphragm, of an orificed baffle member of solid resonant material, having means associated therewith adjacent the front surface thereof forming a plurality of passages parallel with the front surface of said resonant baffle member, the resonant baffle member and means including the passages adapted to modify or modulate reproduced tones, effective upon tone frequencies within the range of the device, resonated to the ears of a listener, said apparatus adapted for mounting within an apparatus cabinet.

13. Acoustic apparatus comprising the combination with a loud speaker including a hollow diaphragm and driving means of the class described, of an orificed baffle member of solid resonant material such as wood, for example, or other suitable material, having means associated therewith adjacent a surface thereof forming one or more channels parallel with at least one adjacent surface of said baffle member, the resonant baffle member and means including the said channels adapted to modify or modulate reproduced tones, effective upon tone frequencies within the range of the apparatus, resonated to the ears of a listener, said apparatus adapted for mounting within an apparatus cabinet as a cabinet unit.

14. Acoustic apparatus adapted to modify or modulate reproduced tones resonated to the ears of a listener, in combination with a loud speaker having a hollow diaphragm and driving means of the class described and an apparatus cabinet including an orificed sound baffle located in front of the lour speaker, comprising a resonant vibratory device arranged within metallic means forming a plurality of resonant members extending in space, from a front part to a rear part of the vibratory element of the device, said device adapted for mounting upon a sound baffle adjacent an outlet provided therein for the passage of sound vibrations from a diaphragm.

15. The combination with sound reproducing means including a diaphragm and driving means for the diaphragm, and a cabinet having walls forming an air chamber, an outlet for sound from the air chamber, the air chamber having vibratory air communication with the atmosphere to the rear of the cabinet, of a sound board with an opening therein located in the cabinet and air chamber adjacent the front of said air chamber and cabinet, and means arranged in front of the sound board spacing the sound board from the front wall structure of the cabinet and forming between the front surface of the sound board and the inner surface of the front wall structure of the cabinet, one or more supplementary air column channels for oscillating air vibrations within the cabinet in a region adjacent said outlet and the front wall structure where otherwise the air column of said air chamber would occupy the air space in said region, the sound board interposed between said supplementary air columns and said air column in the air chamber to the rear of the sound board.

16. The combination with apparatus of the character described including a cabinet, an air chamber therein, a sound baffle of resonant material having an outlet for sound, a relatively large diaphragm with supporting means, driving means operatively coupled with the diaphragm, the sound baffle and diaphragm located in said air chamber, of means forming at least one supplementary resonant air column adjacent the front surface of the said sound baffle member and a front element of the cabinet structure, said air column or air columns arranged so that during operation of said apparatus sound vibrations will oscillate in at least one air column in front of the baffle medium between the fluid area within the cabinet walls directly in front of said baffle adjacent said outlet and the fluid area within said cabinet in front of the outlet in said sound baffle medium and of the diaphragm, the sound baffle medium spaced within the cabinet from the front structure element of the cabinet walls.

17. Acoustic apparatus comprising the combination with a cabinet and a loud speaker having a diaphragm with driving means for the diaphragm, of a baffle support, an outlet therein for sound, a resonant vibratory device comprising means forming a plurality of air channels and at least one orificed support for said air channel means, at least one resonant vibratory arm in combination with the resonant vibratory device and baffle support, the baffle support supporting the loud speaker and said resonant vibratory device adjacent said outlet for sound, said apparatus located in an air chamber within the cabinet, said resonant vibratory device, baffle support, and associated cabinet walls and the air column therein acting jointly to modify sound waves substantially as set forth.

18. Sound reproducing apparatus comprising a vibratory diaphragm associated with means for producing sound vibrations, a plurality of tubular members positioned adjacent the diaphragm and a plurality of metal resonators positioned adjacent the diaphragm and tubular members.

19. Sound reproducing apparatus comprising a vibratory diaphragm associated with a source of sound vibrations, a plurality of tubular members positioned adjacent the diaphragm, and a plurality of U-shaped metal resonators positioned in contact with the diaphragm.

20. In sound reproducing apparatus, a vibratory diaphragm associated with a source of sound vibrations, a sound board spaced from the vibratory diaphragm, one or more ring shaped members interposed between the sound board and the diaphragm, and one or more metal resonators engaging with one or more of the ring shaped members.

21. Sound reproducing apparatus comprising a vibratory diaphragm associated with a source of sound vibrations, a sound board, and a plurality of metal resonators engaging with the diaphragm and sound board.

22. Sound reproducing apparatus comprising a vibratory diaphragm associated with a source of sound vibrations, a sound board spaced from the diaphragm, a plurality of tubular members interposed between the sound board and the diaphragm, and a plurality of metal resonators engaging with the sound board and the diaphragm.

23. Sound reproducing apparatus comprising a vibratory diaphragm associated with a source of sound vibrations, a sound board spaced from the diaphragm, a plurality of tubular members interposed between the diaphragm and the sound board, and a plurality of metal U-shaped resonators having legs thereof engaging with the diaphragm and the sound board.

24. Sound reproducing apparatus comprising a vibratory diaphragm associated with a source of sound vibrations, a sound board having a sound opening therein, and an auxiliary diaphragm interposed between the sound board and the vibratory diaphragm, the said auxiliary diaphragm including a plurality of tubular members, a plurality of metal resonators, and supporting means to which the tubular members and metal resonators are attached.

25. Sound reproducing apparatus comprising a loud speaker, a sound board spaced from the loud speaker, a ring shaped auxiliary diaphragm interposed between the loud speaker and the sound board, and a plurality of metal resonators engaging the loud speaker and the sound board for by-passing sound vibrations around the auxiliary diaphragm to and from the loud speaker and the sound board.

26. In sound reproducing apparatus, an auxiliary diaphragm comprising a support having a plurality of hollow members and a plurality of metal resonators secured thereon.

27. In sound reproducing apparatus, an auxiliary diaphragm comprising a plurality of ring shaped supports, a plurality of tubular members positioned between the supports, and a plurality of spaced metal U-shaped members extending over the edges of the supports and tubular members.

28. In sound reproducing apparatus, a ring shaped auxiliary diaphragm having a U-shaped metal member mounted thereon with a leg of the member projecting inwardly beyond the inner circumferential edge of the said diaphragm.

29. In sound reproducing apparatus, a vibratory diaphragm having a flanged edge, and a plurality of tubular members positioned at right angles to the axis of the diaphragm and secured to and distributed around the said flanged edge of the diaphragm.

30. In sound reproducing apparatus, a sound board having a sound opening, a vibratory diaphragm extending through the said opening in the sound board, the said diaphragm having a flange thereon, and a plurality of tubular members positioned at right angles to the axis of the diaphragm and located between the flange and the sound board.

31. Sound reproducing apparatus comprising a loud speaker, a sound board spaced from the loud speaker, a ring shaped auxiliary diaphragm interposed between the loud speaker and the sound board, and one or more metal resonators positioned to by-pass sound vibrations around the auxiliary diaphragm from the loud speaker to the sound board.

RAYMOND E. BOWLEY.